United States Patent [19]

Taylor

[11] Patent Number: 5,577,524
[45] Date of Patent: Nov. 26, 1996

[54] LARGE DIAMETER RESETTABLE RUPTURE PIN RELIEF VALVE

[76] Inventor: Julian S. Taylor, 8300 SW 8th, Oklahoma City, Okla. 73128

[21] Appl. No.: 559,683

[22] Filed: Nov. 15, 1995

[51] Int. Cl.⁶ .................................................. F16K 17/14
[52] U.S. Cl. .......................................... 137/70; 137/68.11
[58] Field of Search .................................. 137/68.11, 70

[56] References Cited

U.S. PATENT DOCUMENTS

| | | | |
|---|---|---|---|
| 5,012,834 | 5/1991 | Taylor | 137/70 |
| 5,273,065 | 12/1993 | Taylor | 137/70 |
| 5,348,039 | 9/1994 | Taylor | 137/70 |

*Primary Examiner*—John C. Fox
*Attorney, Agent, or Firm*—Robert K. Rhea

[57] ABSTRACT

A large diameter in-the-field resettable rupture pin relief valve is formed by superposed valves normally closing a valve inlet port and released to open the port under excess pressure by collapsing the pin. Pressure operated cylinders connected with the superposed valves and pin supports reposition these components for replacing the collapsed pin without exhausting all fluid pressure in the valve.

13 Claims, 6 Drawing Sheets

LARGE DIAMETER RESETTABLE RUPTURE PIN RELIEF VALVE

BACKGROUND OF THE INVENTION

1. Field of the Invention.

This invention relates to relief valves and more particularly to a relatively large diameter rupture pin relief valve which is safely resettable in the field under pressure while flowing.

2. Description of the prior art.

I have successfully utilized a collapsible pin relief valve for monitoring fluid pressure in a conductor which opens under excess pressure in accordance with Euler's law for slender columns. The most pertinent patents are believed to be my U.S. Pat. Nos. 5,273,065 issued Dec. 28, 1993, and No. 5,348,039 issued Sep. 20, 1994, both for large diameter and a relatively high pressure relief valves. Both of these patents feature a relief valve having dual diameter pistons normally closing confronting open ends of axially aligned sleeves, and when moved to a valve open position, a piston rod is axially forced toward one end of a collapsible pin. The principal feature being the larger diameter piston partially balances out the pressure against the pin permitting the use of a smaller diameter pin to monitor fluid pressure. However, when one of these valves has opened in response to excess fluid pressure, it is necessary to reduce the fluid pressure in the conductor being monitored to near atmosphere in order to move the pistons toward a valve closed position before it is possible to insert a new collapsible pin.

This invention is distinctive over the above named valves by providing an auxiliary power assembly connected with the valve housing for moving the collapsible pin supporting elements from a pin collapsed position to a new pin receiving position with fluid pressure in the valve and conductor being monitored.

SUMMARY OF THE INVENTION

First and second embodiments of the invention include the following components:

A valve body having axial openings and a centrally bored cap closing one end and forming an inlet port at its other end of substantially equal diameter with respect to a lateral outlet port. A valve seat is formed on the inner limit of the inlet port. A valve cage supports a valve seat ring normally seated on the inlet port valve seat, and having an annular valve seat opposite the inlet port valve seat. The valve cage is moveable toward and away from the inlet port valve seat by a hollow stem slidably received by the valve cap and having an annular flange at its terminal end normally abutting the outer surface of the housing cap.

A valve contained by the valve cage is normally seated on the valve seat ring opposite the inlet port valve seat for closing the inlet port. The valve includes a valve stem slidably received by the hollow stem and having a T-shaped end opposite the valve normally supporting one end of a collapsible pin supported at its other end portion by a pin cage means connected with the hollow stem flange and moveable toward and away from the upper limit of the cylinder supporting cage. A plurality of pressure cylinders are mounted on the upper limit of the cylinder cage and include piston rods connected with the hollow stem flange for lifting the latter and the collapsible pin cage in response to actuation of cylinder controls for receiving a replacement collapsible pin after excess pressure has opened the valve by collapsing the pin.

The second embodiment is provided with a transducer, monitoring fluid pressure in the inlet port. A solar panel energized microprocessor is interposed between the transducer and cylinder controls for regulating fluid pressure in the valve to a predetermined value less than the buckling point of the collapsible pin.

The principal object of this invention is to provide a rupture pin relief valve having an auxiliary power assembly for regulating fluid pressure in an operating system monitored by the valve and repositioning collapsible pin supporting valve components after a relief valve has opened by collapsing a pin in response to pressure above a predetermined value.

DESCRIPTION OF THE PREFERRED EMBODIMENTS

Like characters of reference designate like parts in those figures of the drawings in which they occur.

In the drawings:

Referring first to a first embodiment illustrated by FIGS. 1–4, the reference numeral 10 indicates the valve as a whole which is substantially pipe T-shaped in side elevation.

The valve 10 includes a valve housing or body 12 having axially aligned openings 14 and 16 normal to a lateral outlet port 18. The opening 14 forms an inlet port of smaller diameter than the opening 16, and a fluid passageway with the outlet port 18. The opening 16 is normally closed by a valve cap 20 having an O-ring seal 21 and a central bore 22. Bolt flanges 24 surround the inlet port 14 and outlet port 18 for connection with a pipe or a vessel, neither being shown. The inlet port 14 is characterized by an inwardly projecting sleeve 26 having an annular valve seat 28 formed on its inner end portion. Valve and valve cage means 30 normally closes the valve by seating on the sleeve seat 28.

The valve cage means comprises a first valve seat ring 32 having an outer peripheral seat 34 and crush seal 35 normally seating and sealing with the sleeve seat 28 and having an annular inward cylindrical valve seat 36 normally closed by a second valve 38, having an O-ring 40 normally slidably sealing with the cylindrical valve seat wall 36. The valve seat ring 32 is connected with a plurality (3), in the example shown, of upstanding posts 42 depending from a plate 44 having a tubular upstanding stem 46 slidably projecting through the housing cap aperture 22 and integral with an outstanding flange 48 on its uppermost end normally overlying the valve cap 20.

The valve 38 includes an axial rod stem 50 longitudinally slidably received by the tubular stem 46 and similarly having an annular flange 52 at its upper end normally disposed in vertical spaced relation with respect to the tubular stem flange 48 for the reasons presently explained. The tubular stem 46 and valve stem 50 are sealed fluid tight with adjacent components by O-ring seals 53.

Pin cage means 31 comprising a plurality (3 or 4), three being shown, of rod like members, such as bolts 54, connected at one end in equal circumferentially spaced relation with the tubular stem flange 48, in surrounding relation with respect to the valve stem flange 52, have an end plate 56 at their outward ends axially supporting a threadedly connected pin holder 58. Each of the bolts of 54 are surrounded by a like plurality of sleeve spacers 60 for maintaining the pin end plate 56 a predetermined distance from the outwardly projecting end of the valve stem flange 52. The outwardly projecting end of the valve stem flange 52 and the downwardly projecting end portion of the pin holder 58 are each axially bored for receiving pin bushings 62 for nesting respective end portions of a collapsible pin 64.

A collapsed pin overriding assembly includes a platform cage means 66 similarly comprising a plurality (3) of bolt like standards 70 and surrounding spacers 71 secured at one end in circumferentially spaced relation to the peripheral portion of the valve cap 20 adjacent the tubular stem flange 48 and support at their other end portions a platform or plate 72 having an axial opening 73 loosely surrounding the collapsible pin 64 and having apertures 75 permitting longitudinal sliding movement of the sleeves 60 as presently explained. The plate 72 supports a like plurality of reciprocable linear actuating elements, such as pressure operated cylinders or ram means 74, each having a piston rod 76 slidably projecting through the support plate 72 and secured at its remote end to the tubular stem flange 48 for moving the valve and valve cage means 30 toward and away from the valve seat 28 in the manner hereinafter explained.

Control means 78 is provided for replacing a collapsed rupture pin and resetting the valve to a pressure monitoring position without disconnecting the valve or reducing fluid pressure therein to atmospheric. The control means 78 comprises a piston rod retracting hose 80, having a vent valve 81, connected with one end portion of the respective ram means 74. A second hose 82, similarly having a vent valve 83, for advancing the piston rods 76 is connected to the other end portion of the respective ram means 74. A source of fluid pressure, such as air under greater than atmospheric pressure in a portable tank 84, is connected by tubing with the respective hose 80 and 82 through a piston rod retracting valve 86 and a piston rod extending valve 88 respectively connected with an on/off control valve 90 having a quick connect coupling. Since the portable fluid pressure tank 84 is not normally connected with the control means, the tubular stem flange 48 is secured to the body cap 20, as by bolts 91, to insure the seat ring 32 remains sealed with the sleeve seat 28.

Figure 1:
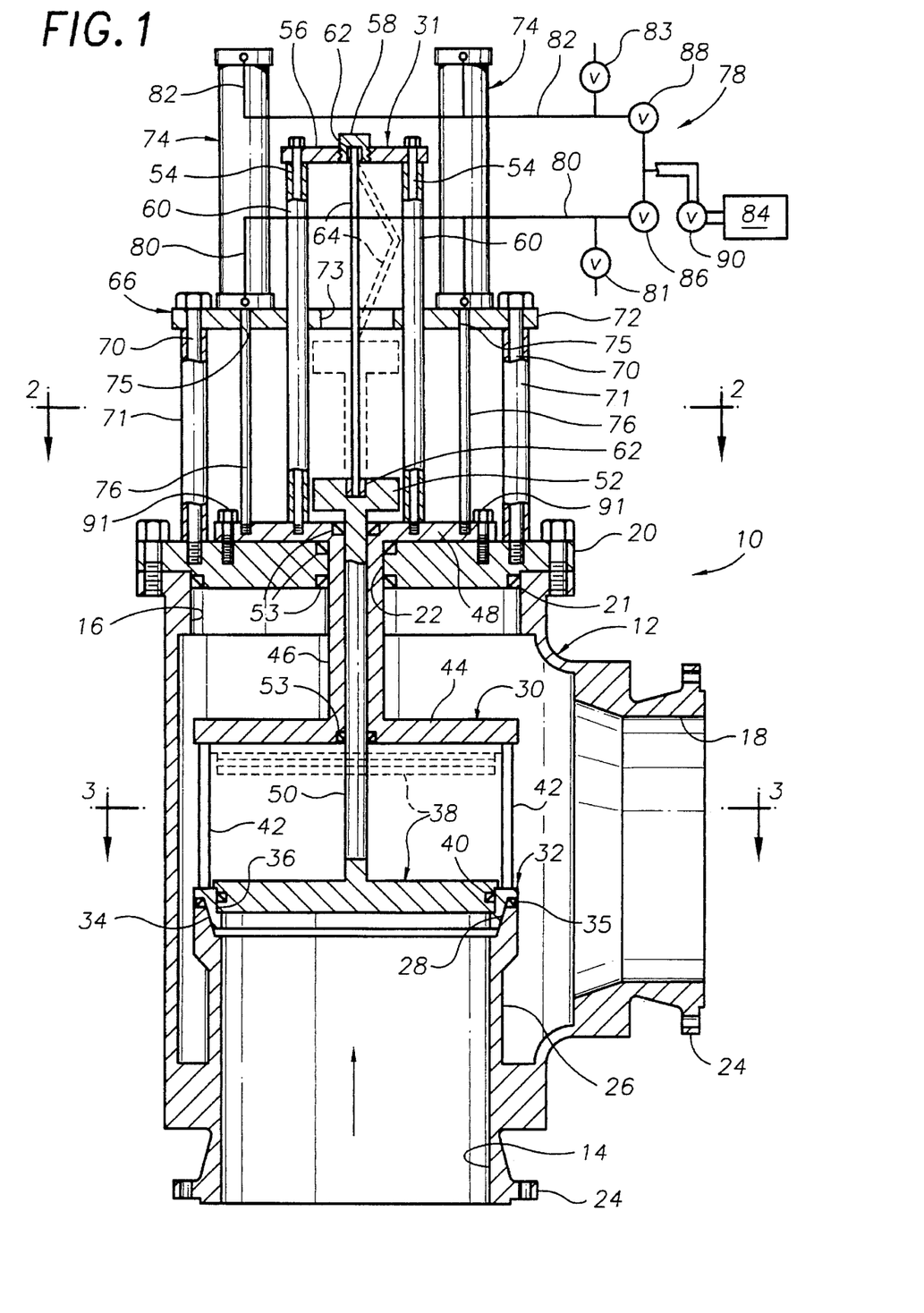
FIG. 1 is a vertical cross sectional view illustrating one embodiment of a relief valve in closed position by solid lines, and illustrating by dotted lines, the valve in excess pressure released open position.
Figure 2:
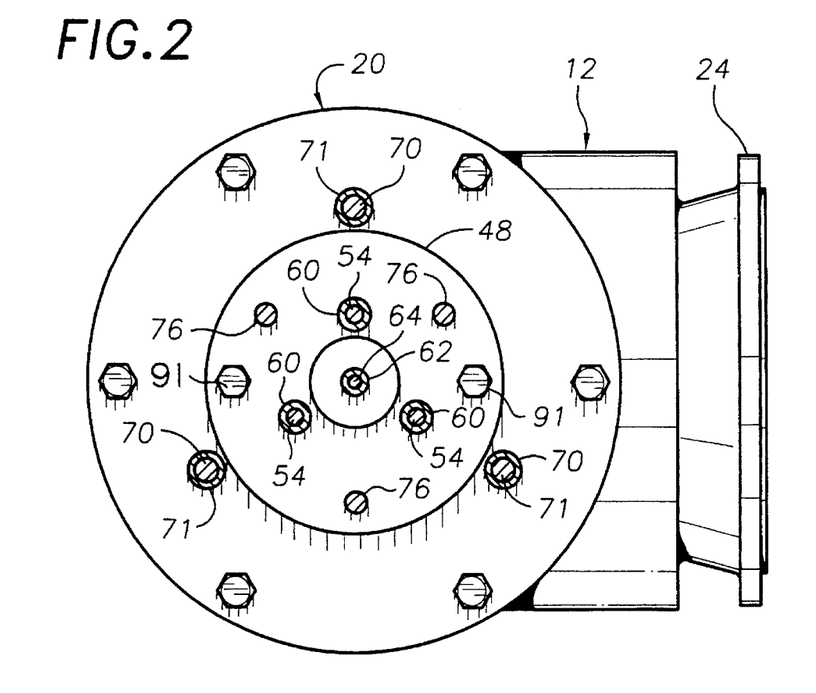
FIGS. 2 and 3 are horizontal cross sectional views partially in elevation taken substantially along the lines 2—2 and 3—3 of FIG. 1.
Figure 3:
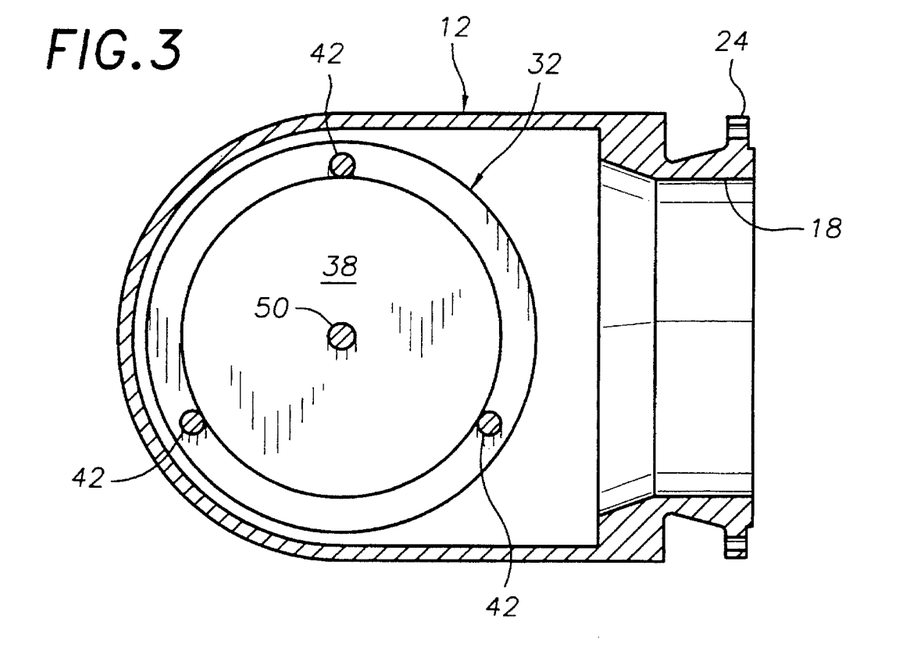
Figure 4:
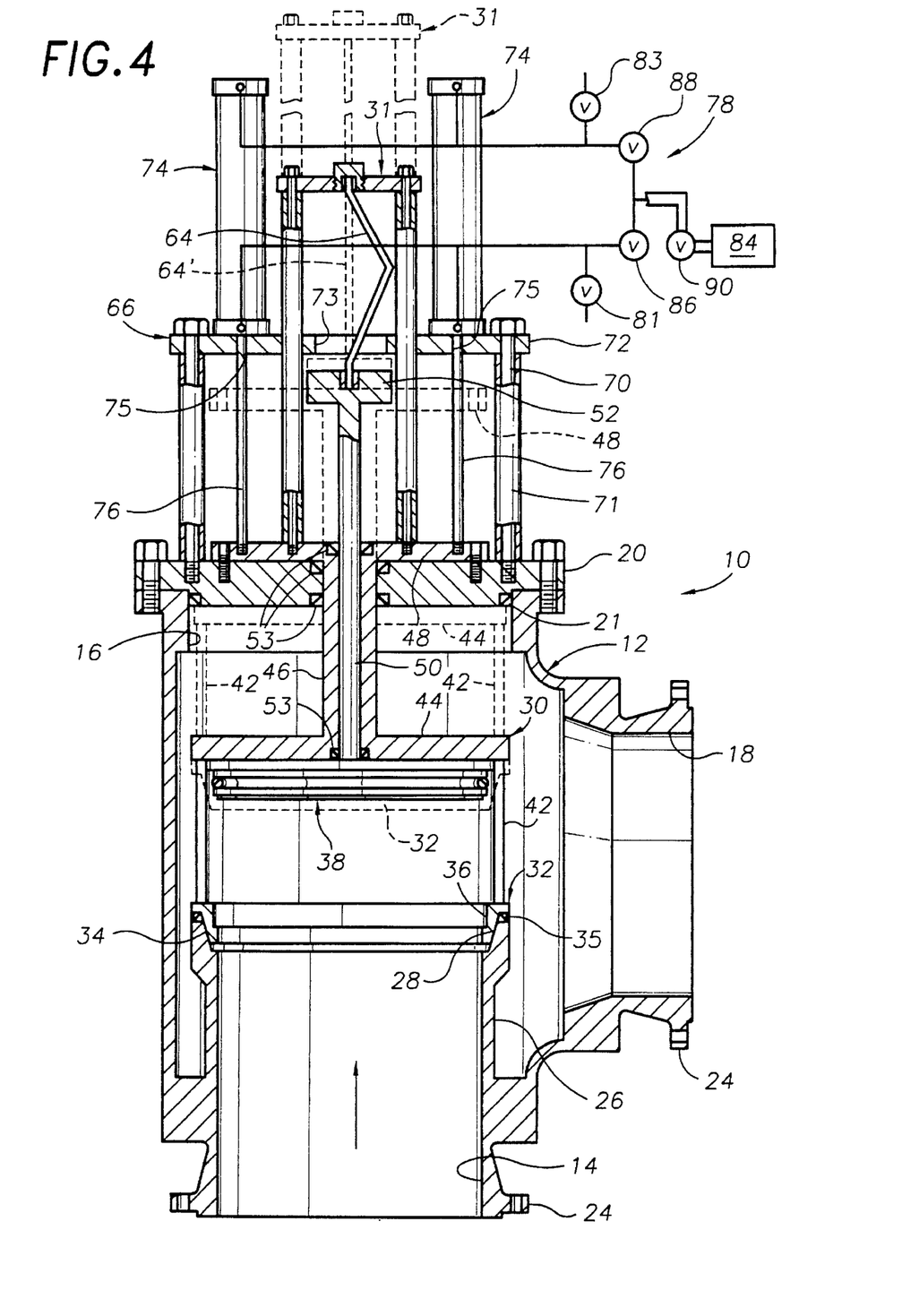
FIG. 4 is a vertical cross sectional view, similar to FIG. 1, illustrating the valve in pressure released pin collapsed position by solid lines, and illustrating by dotted lines, valve components positioned for replacing a pin.

In the operation of the first embodiment, illustrated by FIGS. 1–4, the valve 10 is initially in a closed position as illustrated by solid lines (FIG. 1). When excess fluid pressure in the inlet port 14 initially approaches a predetermined value, the valve 38 is moved incrementally toward the collapsible pin 64, causing the pin to bow slightly, while the O-ring seal 40 of the valve 38 maintains a fluid tight seal with the cylinder wall forming the valve seat 36. As the pressure continues to increase the friction seal, generated through time between the O-ring seal of the valve 38 and its valve seat, is broken which insures accurate monitoring of the fluid pressure in the inlet port by the pin 64. When this pressure exceeds the predetermined value, the valve 38 is moved off its seat 36 collapsing the pin 64 to its dotted line position by moving the valve stem 50 toward the collapsible pin.

After correcting the problem resulting in excess fluid pressure unseating the valve 38, and reducing the fluid pressure at the inlet port 14 below the predetermined critical value, the valve is reset with a replacement pin 64' installed in the following manner:

The bolts 91 securing the tubular stem flange 48 to the body cap 20 are removed. The on/off control valve 90 and the vent valve 83 are opened and the piston rod retracting valve 86 is opened which moves the piston rods upwardly, as viewed in the drawings, and simultaneously lifts the tubular stem flange 48 and valve cage means 30, including the valve ring 32 as well as the valve cage means 31, to the fragmentary dotted line position of FIG. 4. During this action, the valve stem flange 52 is interrupted in its upward movement by the cage support plate 72 so that the valve 38 is disposed adjacent the depending surface of the valve cage plate 44. The pin holder 58 is loosened after removing the collapsed pin 64, and a replacement pin 64', indicated by the dotted lines (FIG. 4), is installed and pushed into the bushing insert 62 by tightening the pin holder 58. Thereafter, the piston rods 76 are extended by closing the valve 86, opening the control valve 88 and vent valve 81 to move the tubular stem flange downwardly by the extension of the piston rods, simultaneously moving the valve cage means 31 and the valve seat cage 30 to reseat the valve 38 on the seat ring seat 36 and the seat ring 32 on the sleeve seat 28. The bolts 91 are reinstalled, thus placing the valve 10 in operative position. The control means 78 can then be removed.

Figure 5:
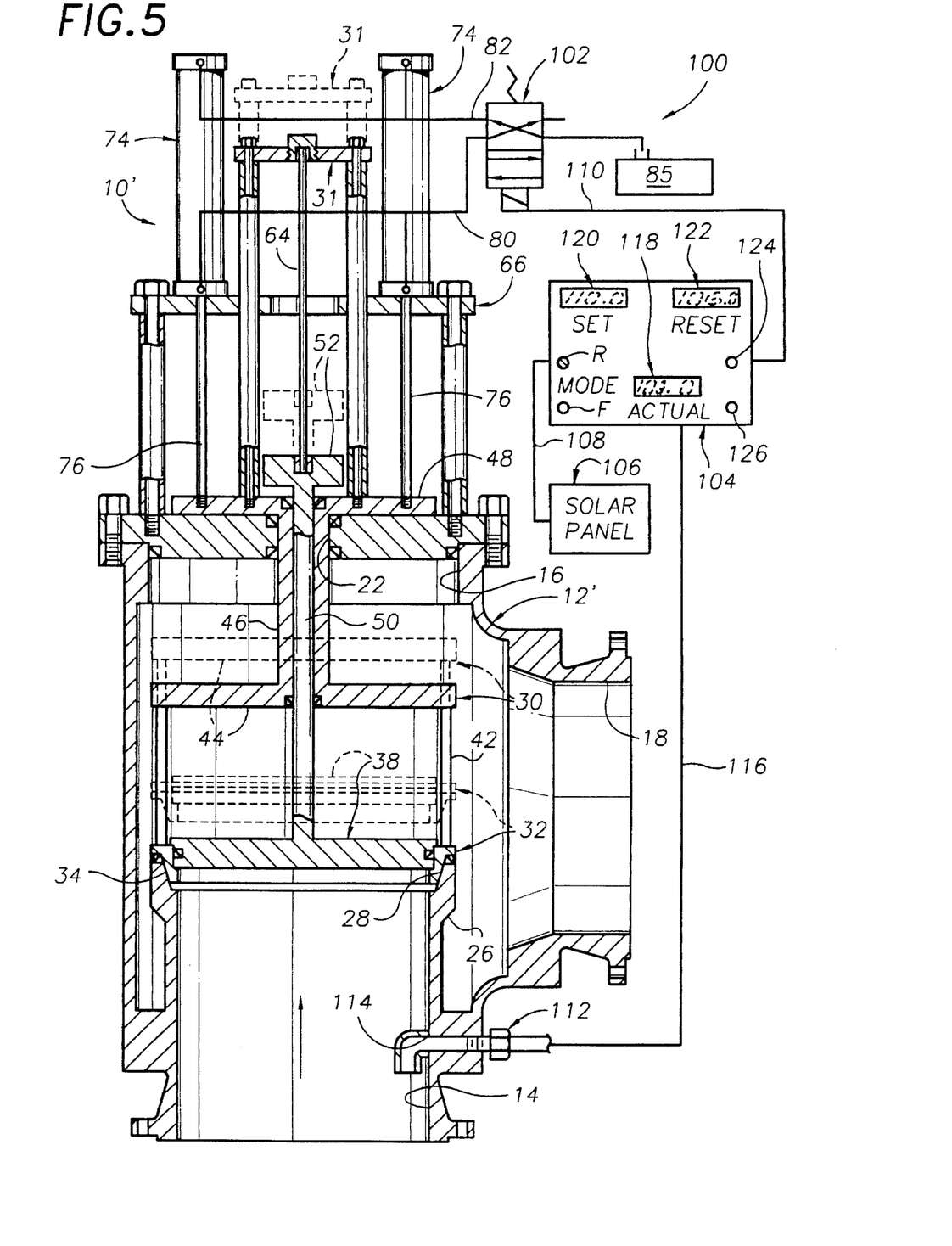
FIG. 5 is a vertical cross sectional view of a second embodiment of the relief valve illustrated in closed position by solid lines, and in inlet port opened position by dotted lines.
Figure 6:
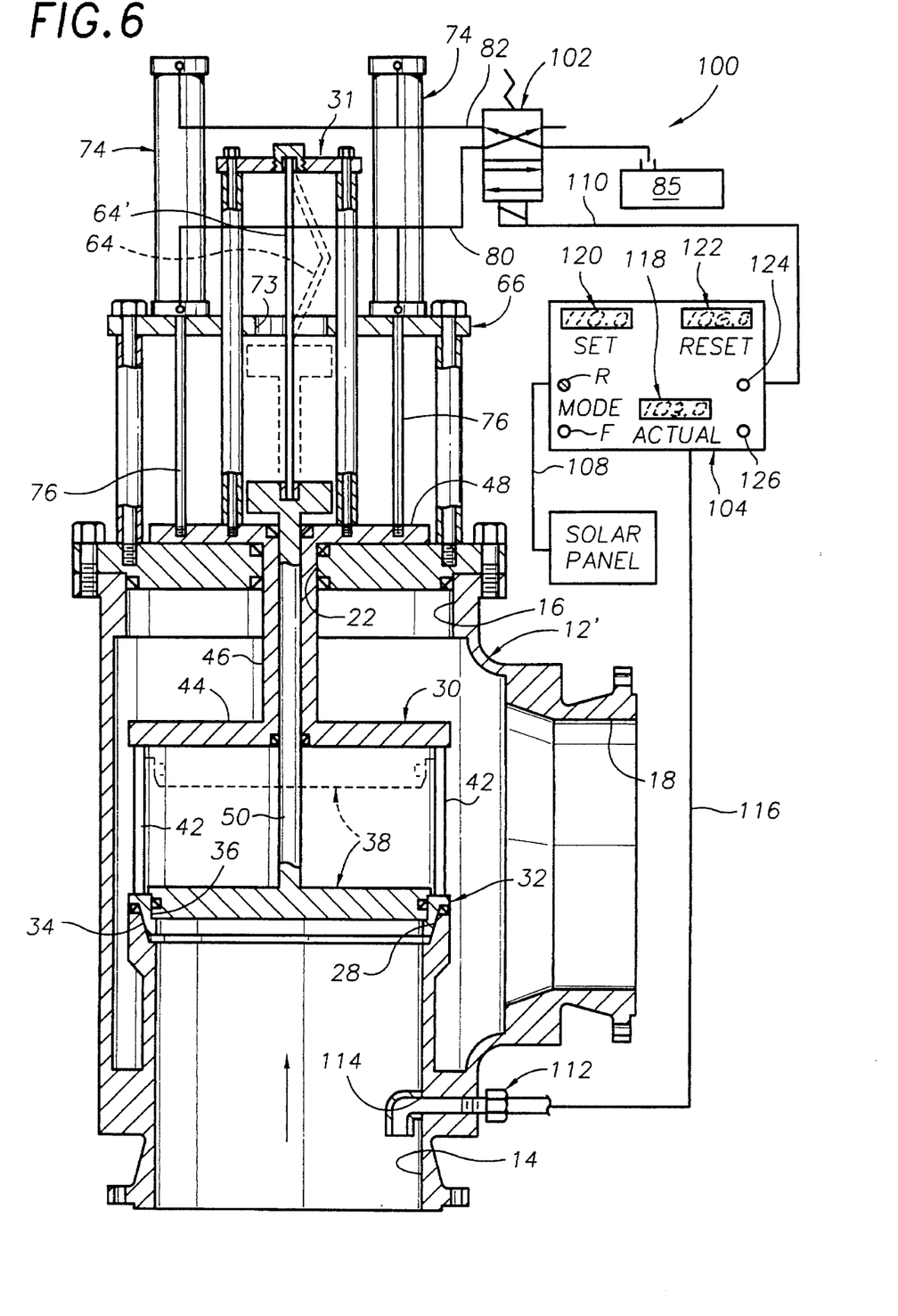
FIG. 6 is a vertical cross sectional view similar to FIG. 1, of the second embodiment of the valve; and, FIG. 7 is a vertical cross sectional view of the second embodiment, similar to FIG. 4, utilizing the second embodiment collapsed pin resetting apparatus.
Figure 7:
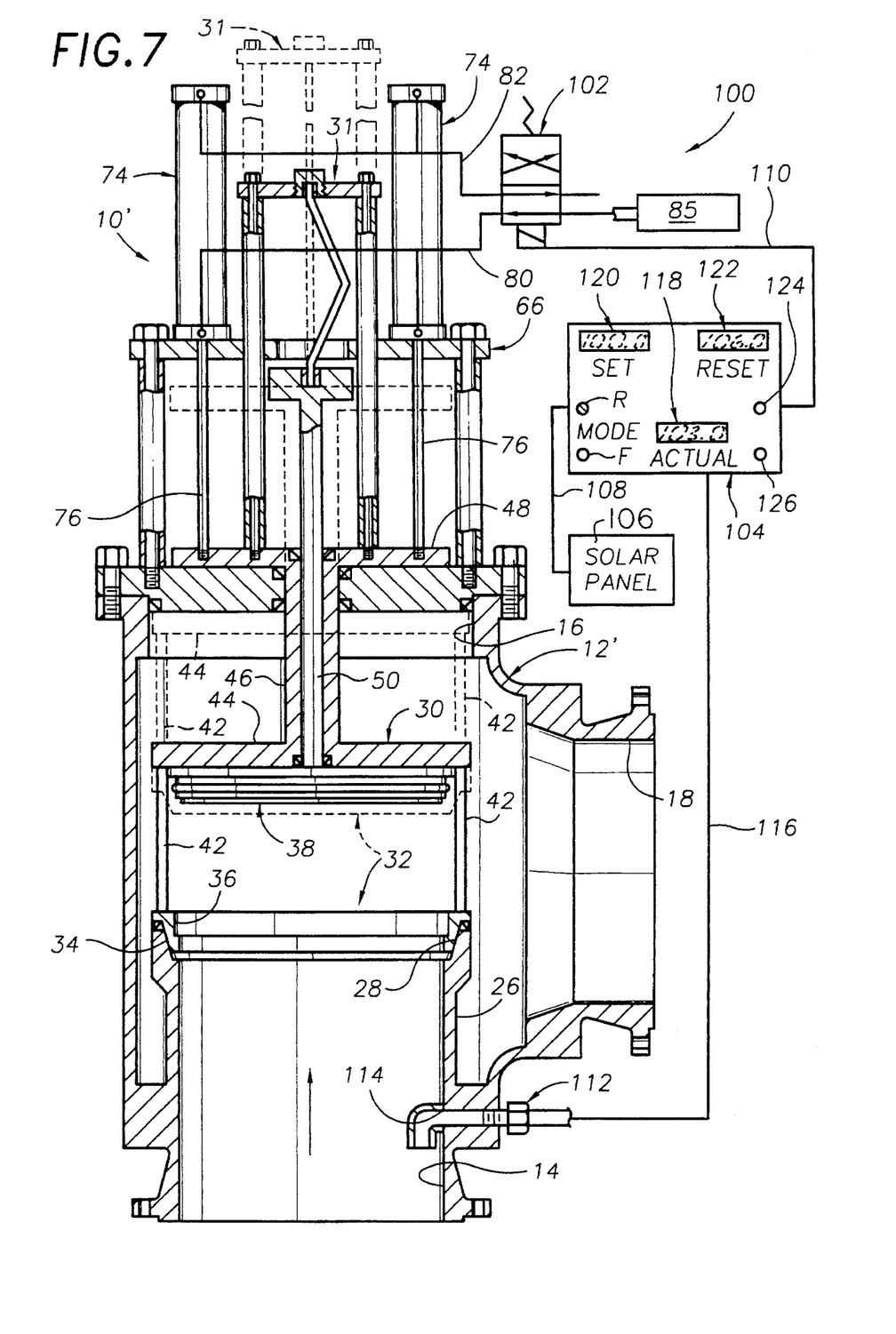

Referring now to a second embodiment illustrated by FIGS. 5–7 in which identical numerals indicate identical parts, and modified parts bear prime numerals, and additional components are numbered in the one hundred series.

The reference numeral 10' indicates a substantially identical relief valve in which the operating control means 78 of the first embodiment is replaced with a solar panel 106 and fluid power controls 100. A fluid pressure source 85 remains connected with the operating hose 80 and 82 through a two position solenoid actuated spring return four-way valve 102. In this embodiment, the tubular stem flange 48 is not secured to the body cap 20 for the reason believed presently apparent. A microprocessor unit 104 is connected with the solar panel 106 by a conductor 108 to maintain the microprocessor battery, not shown, in a charged condition. Wiring 110 connects the microprocessor with the four-way valve solenoid. The valve body 12' is modified by connecting a pressure transducer 112 with the valve body wall for communicating with the inlet port 14 through a wall aperture 114. The pressure transducer 112 is connected with the microprocessor by a conductor 116 to indicate actual inlet fluid pressure on an LCD readout 118. Other LCD panels 120 and 122 indicate "set" and "reset" point pressures, respectively. Mode indicating lamps R and F provide a "regulate" or "fault" signal of the valve operating mode. Control buttons 124 and 126 on the microprocessor shift the control valve 102 for extending or retracting the cylinder piston rods 76 manually.

In the operation of the second embodiment, the principal feature of the valve 10' is maintaining fluid pressure in a system between selected limits, below a critical pin collapsing fluid pressure value. This is accomplished by the microprocessor 104 acting, in response to the transducer fluid pressure signals, to retract or extend the piston rods 76 and move the valve cage means 30 and pin cage means 31, as a unit, toward and away from the dotted line position of FIG. 5 to open or close the inlet port 14.

For example, assume the "set" pressure value is 106.0 and the actual pressure in the inlet port 14 is 103.0. The seat ring valve 32 and valve 38 remain closed but if the actual fluid pressure reaches the reset pressure value 106.0, the microprocessor actuates the four way valve 102 to move the piston rods 76 and unseat the valve cage means 30 and allow fluid flow through the valve passageway until the fluid pressure indicated by the panel 118, has decreased to an acceptable value.

In the event of a malfunction of equipment, the sequence of valve component operation in monitoring the fluid pressure and releasing excess fluid pressure by the collapse of the pin 64 is identical with that described hereinabove for the first embodiment 10 of the valve.

After the pin has ruptured, the operator visually checks the fluid pressure on the LCD panel 118, and if it is at or below the reset pressure indicated by the LCD panel 122, he closes the control switch 124 for energizing the solenoid of the control valve 102 to lift the piston rods 76 and valve and pin cages 30 and 31 to the dotted line position of FIG. 6. The sequence of removing the collapsed pin 64 and replacing it with a replacement pin indicated by dotted lines, is substantially equal with the sequence described hereinabove for the first embodiment. After installing a replacement pin 64', the other microprocessor switch 126 is closed to shift the control valve 102 and extend the piston rods 76 to the solid line position of FIG. 6 which seats the valve 38 on the valve seat ring seat 36, inturn seated on the sleeve seat 28, to complete one cycle of the second embodiment collapsed pin replacement operation.

Obviously the invention is susceptible to changes or alterations without defeating its practicability. Therefore, I do not wish to be confined to the preferred embodiment shown in the drawings and described herein.

I claim:

1. A resettable relief valve for connection with a large diameter vessel containing fluid under greater than atmospheric pressure, comprising:

a valve body having an axial inlet port and a lateral outlet port forming a fluid passageway and having an axial opening opposite the inlet port;

a valve seat on the inner limit of the inlet port;

first and second superposed valve means normally closing the inlet port and respectively having first and second valve stems projecting outwardly through the axial opening;

collapsible pin means extending axially outward from the body opposite the inlet port including a pin having a predetermined buckling point axially supported by the outwardly projecting second valve stem of said first and second valve stems for normally maintaining said inlet port closed while the fluid pressure in the inlet port is less than the buckling point of the pin and releasing the second valve of said superposed valve means when the fluid pressure in the inlet port exceeds the buckling point of the pin;

platform means connected with the body adjacent the periphery of said tubular valve stem flange;

linear reciprocable means on said platform for moving the first valve stem of said first and second valve stem means;

control valve and tubing means connecting a source of fluid under pressure with said reciprocable means for axially moving said first and second valve means relative to each other and the valve body and reclosing the inlet port.

2. The relief valve according to claim 1 in which said first valve of said first and second valve means includes:

a valve seat ring having a peripheral seat normally sealing with the inlet port seat and having an annular inner seat;

valve cage means including a support plate connected with said ring in axially spaced relation; and, a tubular stem axially connected at one end with said support plate and having an annular flange at its other end.

3. The relief valve according to claim 2 in which said second valve of said first and second valve means includes:

a valve within said valve cage and having a peripheral seat normally sealing with the seat ring inner seat and having a valve stem rod longitudinally slidably received by said tubular valve stem.

4. The relief valve according to claim 3 in which the collapsible pin means includes:

elongated members axially projecting outward from the tubular valve stem flange; and, an end plate interconnecting the end portions of said members opposite said flange and axially supporting the end portion of said pin opposite said second valve stem.

5. The relief valve according to claim 4 and further including:

a transducer communicating with the inlet port; and, fluid pressure regulating means including microprocessor means interposed between the transducer and the valve of said control valve and tubing means for maintaining the fluid pressure in the valve flow passageway between predetermined values less than the fluid pressure buckling point of said collapsible pin.

6. The relief valve according to claim 1 in which the platform means includes:

a plurality of standards axially projecting outwardly from the body adjacent the periphery of said tubular valve stem flange; and, a platform interconnecting the end portions of said standards opposite said flange.

7. The relief valve according to claim 1 and further including:

fluid pressure regulating means including microprocessor means connected with the inlet port and the valve of said control valve and tubing means for maintaining the fluid pressure in the valve flow passageway between predetermined values less than the fluid pressure buckling point of said collapsible pin.

8. A resettable relief valve for connection with a large diameter vessel containing fluid under greater than atmospheric pressure, comprising:

a valve body having an axial inlet port and a lateral outlet port forming a fluid passageway and having an axial opening opposite the inlet port;

a valve seat on the inner limit of the inlet port;

first and second superposed valve means normally closing the inlet port and having first and second coaxial valve stems projecting outwardly through the axial opening;

collapsible pin means extending axially outward from the body opposite the inlet port including a pin having a predetermined buckling point axially supported by the outwardly projecting second valve stem of said first and second valve stems for normally maintaining said inlet port closed while the fluid pressure in the inlet port is less than the buckling point of the pin and releasing the second valve of said superposed valve means when the fluid pressure in the inlet port exceeds the buckling point of the pin;

platform means including a plurality of standards connected with the body outwardly of said tubular valve stem flange and a platform interconnecting the end portions of said standards;

rams on said platform means and having piston rods connected with the tubular valve stem flange of said first and second valve stem means;

control valve and tubing means connecting a source of fluid under pressure with said cylinders for axially moving said first and second valve means relative to each other and the body for replacing the collapsed pin and reclosing the inlet port.

9. The relief valve according to claim 8 in which said first valve of said first and second valve means includes:

a valve seat ring having a peripheral seat normally sealing with the inlet port seat and having an annular inner seat;

valve cage means including a support plate connected with said ring in axially spaced relation; and, a tubular stem axially connected at one end with said support plate and having an annular flange at its other end.

10. The relief valve according to claim 9 in which said second valve of said first and second valve means includes:

valve means within said valve cage and having a peripheral seat normally sealing with the seat ring inner seat and having a valve stem rod longitudinally slidably received by said tubular valve stem.

11. The relief valve according to claim 10 in which the collapsible pin means includes:

elongated members axially projecting outward from the tubular stem flange; and, an end plate interconnecting the end portions of said members opposite said flange and axially supporting the end portion of said pin opposite said second valve stem.

12. The relief valve according to claim 9 and further including:

a transducer communicating with the inlet port; and, fluid pressure regulating means including microprocessor means interposed between the transducer and the valve of said control valve and tubing means for maintaining the fluid pressure in the valve flow passageway between predetermined values less than the fluid pressure buckling point of said collapsible pin.

13. The relief valve according to claim 8 and further including:

fluid pressure regulating means including microprocessor means connected with the inlet port and the valve of said control valve and tubing means for maintaining the fluid pressure in the valve flow passageway between predetermined values less than the fluid pressure buckling point of said collapsible pin.

* * * * *